United States Patent

[11] 3,562,411

[72] Inventor Rocco Poppa
Addison, Ill.

[21] Appl No 760,495
[22] Filed Sept. 18, 1968
[45] Patented Feb. 9, 1971
[73] Assignee Zenith Radio Corporation
Chicago, Ill.
a corporation of Delaware

[54] INTERMEDIATE FREQUENCY COUPLING NETWORK WITH BRIDGED-T SOUND TRAP FOR A COLOR TELEVISION RECEIVER
10 Claims, 3 Drawing Figs.

[52] U.S. Cl. .......... 178/5.4, 178/5.8, 333/75
[51] Int. Cl. .......... H04n 5/44, H04n 9/00
[50] Field of Search .......... 178/5.4, 5.8A, 5.8, 5.6; 333/75, 76; 325/489

[56] References Cited

UNITED STATES PATENTS 2,207,796 7/1940 Grundmann .......... 178/5.8X
2,884,485 4/1959 Shlachter .......... 178/5.4
3,217,096 11/1965 Caprio et al. .......... 333/76

*Primary Examiner*—Richard Murray
*Assistant Examiner*—George G. Stellar
*Attorneys*—Francis W. Crotty and James E. Tracy

ABSTRACT: Prior to the detection of the luminance and chrominance information conveyed by the IF signal in a color television receiver, the sound carrier component of the IF signal must be strongly attenuated to preclude the development of undesired beat signals in the output of the video detector which would result in picture degradation. The sound carrier can be adequately suppressed without attenuating the color information, which is conveyed over a range or band of intermediate frequencies adjacent to and above the sound carrier, by means of a frequency-selective coupling network comprising a bridged-T trap tuned to the sound carrier frequency. The signal source, supplying the IF signal to the trap, has a capacitive internal output impedance which forms a parallel resonant circuit with the trap at a frequency around the low-frequency end of the color range (at which frequency the trap is inductive) to effectively boost the amplitude response of the coupling network for the color information.

Inventor
Rocco Poppa
By James E. Tracy
Attorney

Inventor
Rocco Poppa
By James E. Tracy
Attorney

INTERMEDIATE FREQUENCY COUPLING NETWORK WITH BRIDGED-T SOUND TRAP FOR A COLOR TELEVISION RECEIVER

This invention pertains to a novel frequency-selective coupling network for the IF (or intermediate frequency) signal of a color television receiver. More particularly, it relates to a signal-translating filter network having a frequency response characteristic appropriate to reject the sound carrier of the IF signal, to avoid the introduction of unwanted intermodulation signal components in the detected luminance and chrominance video signals, without suppressing the color carrier or its modulation components.

In a conventional color television receiver the IF signal, produce by the receiver's RF (or radio frequency) tuner, contains a picture or video carrier at an intermediate frequency of 45.75 megahertz amplitude modulated by luminance or brightness information; a color or chromacarrier at 42.17 megahertz phase and amplitude modulated by color information and having its lower and upper modulation sidebands extending from 41.67 to 42.67 megahertz; and a sound carrier at 41.25 megahertz frequency modulated by sound or audio information. An attenuation circuit, tuned to 41.25 megahertz and located between the output of the RF tuner and the input of the IF amplifying system, suppresses the sound carrier to the extent necessary to establish a particular required amplitude ratio or weighting with respect to the picture and sound carriers in accordance with the intercarrier principle. When those two carriers are properly weighted the 4.5 megahertz intercarrier beat signal (45.75 minus 41.25) between them will be frequency modulated by the sound information. As a result of the attenuation, the sound carrier amplitude at the output of the IF amplifying system will be low enough that the 4.5 megahertz intercarrier beat will not be noticeable in the reproduced color image. However, the sound carrier will be of sufficient magnitude to heterodyne or beat with the color information components of the IF signal to produce in the output of the video detector undesired interfering signals of an amplitude capable of introducing observable distortion in the color picture. A particularly objectionable cross-modulation signal results from the heterodyning of the 42.17 megahertz color carrier with the 41.25 sound carrier which produces a 920 kilohertz beat signal.

In order that the sound information may be delivered at an appropriate amplitude level to the audio section of the color television receiver, while avoiding the development of unwanted beat signals in the video signals supplied to the color picture tube, it is common practice to employ one detector for extracting the sound and synchronizing information from the IF signal and a second detector for deriving the brightness and color information. Undesired beat signals are precluded by attenuating the 41.25 megahertz sound carrier before the IF signal is applied to the input of the luminance and chrominance detector. Unfortunately, to achieve adequate suppression of the sound carrier without attenuating the color information signal components presents a difficult problem since a relatively narrow band of only 420 kilohertz separates the 41.25 megahertz sound carrier from the low-frequency end (41.67 megahertz) of the range of frequencies covered by the modulation sidebands of the color carrier.

Attenuation networks have been developed for rejecting the sound carrier prior to the detection of the video signals, but each of these prior circuits has shortcomings not found in applicant's filter network. Many of these prior circuits fail to provide sufficient attenuation of the sound carrier, suppress color information signals in addition to the sound carrier, and are relatively complex in structure and include a substantial number of circuit elements resulting in high cost. Most of these circuits introduce a considerable amount of in-band insertion loss and deleteriously affect the operation of the receiver, namely they significantly attenuate all of the signal components (including the desired luminance and chrominance components) falling within the entire IF passband. Prior circuits have also reduced the overall bandwidth of the IF signal. Moreover, to obtain the required sharp notching in the response characteristic the previously developed rejection networks are very difficult to adjust or tune. Many employ inductively coupled coils, the required physical spacing of which is extremely critical, manifesting in high labor cost.

Applicant's filtering arrangement has none of the above disadvantages. A relatively small number of circuit elements are needed. There are no critical requirements with respect to the physical spacing of any of the components. Adjusting or tuning is relatively simple requiring minimal time. The coupling network of the present invention thus represents a substantial cost savings over prior attenuating networks. Moreover, and of significant importance, applicant's filter network results in a considerably smaller in-band insertion loss than that attainable heretofore.

It is, therefore, an object of this invention to provide a new and improved signal-translating filter network for shaping the IF band-pass characteristic of a color television receiver.

It is another object to provide a new and improved IF filter network for selectively rejecting only certain components of an IF signal.

It is a further object to provide a novel frequency-selective coupling network whose frequency response curve has an exceptionally steep transition between narrowly separated frequencies.

A more particular object of the invention is to provide a novel and inexpensive frequency-selective coupling network for rejecting the sound carrier of the IF signal of a color television receiver without attenuating the color carrier or its modulation sidebands.

The coupling network of the present invention comprises a signal source for providing an intermediate frequency signal which includes a modulated picture carrier, a modulated color carrier having a frequency lower than that of the picture carrier, and a modulated sound carrier whose frequency is lower than and adjacent to the low-frequency end of the range of frequencies covered by the modulation sidebands of the color carrier. The IF signal source, whose internal output impedance is capacitive, is coupled to the input of a bridged-T trap which functions in conjunction with the output capacitance of the signal source to adjust the relative amplitudes of at least some of the various signal components included in the intermediate frequency signal. The trap is tuned to the sound carrier frequency to attenuate the sound carrier. The output capacitance of the signal source, in combination with the trap, are tuned to a predetermined frequency around the low-frequency end of the aforementioned range to effectively boost the amplitude response of the coupling network for the color information conveyed by the modulation sidebands of the color carrier. A load circuit, coupled to the output of the trap, utilizes the intermediate frequency signal as modified by the trap and the source's output capacitance.

The features of this invention which are believed to be new are set forth with particularity in the appended claims. The invention, together with further objects and advantages thereof, may best be understood, however, by reference to the following description in conjunction with the accompanying drawings in which like reference numbers identify like elements and in which:

Figure 1:
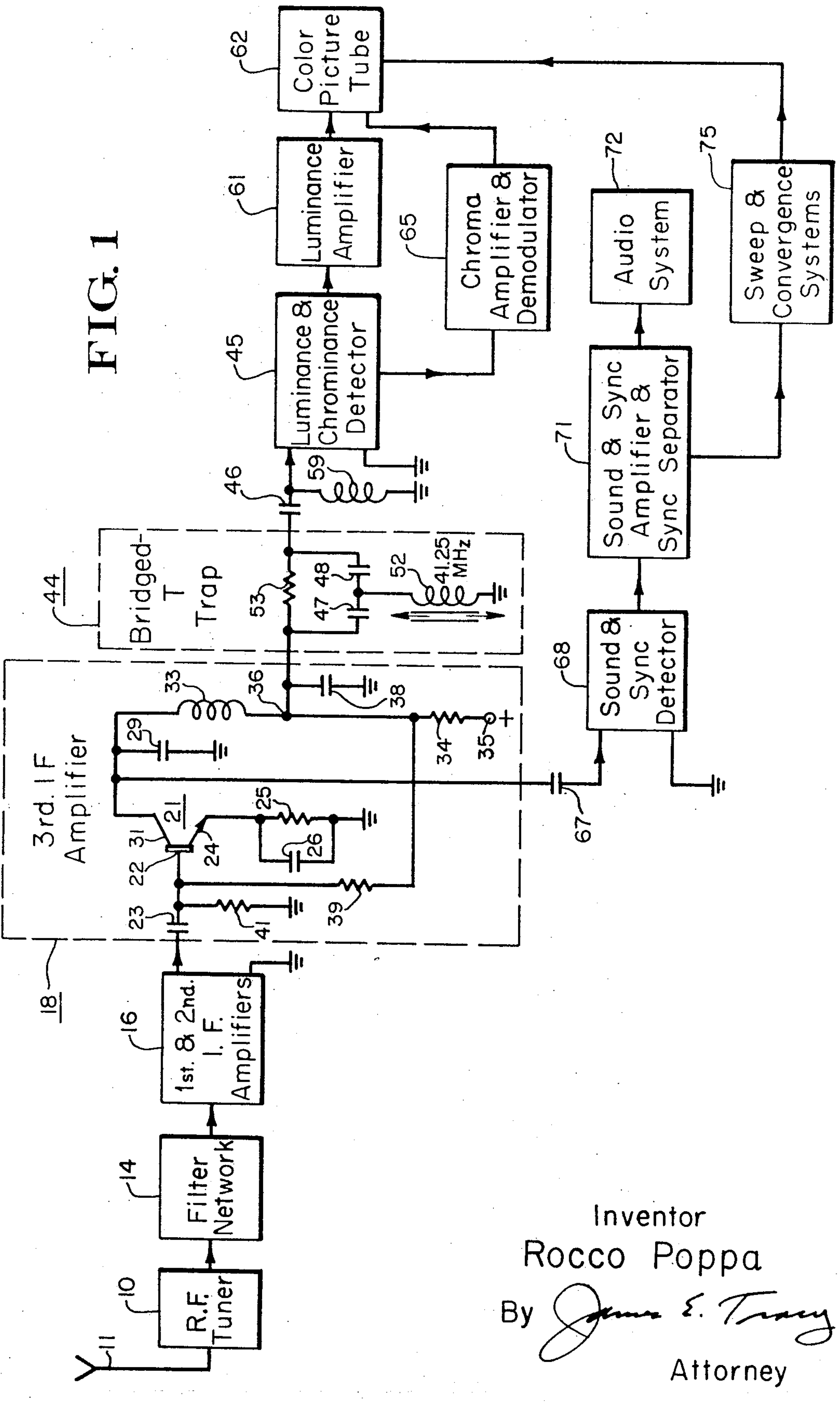
FIG. 1 is a schematic representation, partially in the form of a block diagram, of a color television receiver including an IF coupling network constructed in accordance with one embodiment of the invention.

Referring now more particularly to FIG. 1, the illustrated color television receiver has an RF tuner 10 whose input is connected to a receiving antenna 11. Tuner 10 customarily comprises a tunable RF amplifier, a variable frequency local oscillator, and a mixer having a tuned or frequency-selective output circuit. The tuner facilitates the selection of a desired television signal, of a program transmitted in color and conveyed in a particular television channel, from the television signals of the several other channels that are usually available in a given location. Under the television transmission standards existing in the United States, each television channel occupies a total bandwidth of 6 megahertz and a transmitted television signal includes two different RF carriers separated in the frequency spectrum by 4.5 megahertz. The lower frequency RF carrier is modulated by the picture or video information of the televised program. Specifically, the carrier is amplitude modulated by the brightness or luminance information and also by a 3.58 megahertz subcarrier which has been previously phase and amplitude modulated by the color or chrominance information. The higher frequency RF carrier is frequency modulated by the sound or audio information.

In accordance with the superheterodyne technique, the two received RF carriers of the selected channel are beat or heterodyned with the local oscillator signal to produce in the tuned output circuit of the mixer, which provides the output of the RF tuner, an intermediate frequency signal which includes an amplitude modulated picture IF carrier whose modulation components convey the luminance information, a phase and amplitude modulated color IF carrier the modulation components of which convey the color information, and a frequency modulated sound IF carrier having modulation components conveying the audio information. The color and sound IF carriers have fixed frequency separations of 3.58 and 4.5 megahertz respectively from the picture IF carrier. The precise frequencies of the IF carriers are determined by the operating frequency of the local oscillator. In accordance with present industry practice, when the RF tuner is properly tuned to receive a television signal representing a program transmitted in color, the local oscillator will be operating at a frequency appropriately higher than both of the received RF carriers to establish the sound IF carrier at 41.25 megahertz, the color IF carrier at 42.17 megahertz, and the picture IF carrier at 45.75 megahertz. The modulation sidebands of the color carrier will cover the frequency range from 41.67 to 42.67 megahertz.

The output of tuner 10 is coupled through a filter network 14 to the input of the first amplifier stage of a three-stage IF amplifying system, the first two stages of which are shown by the single block 16. Preferably, all three stages are transistorized. Filter 14 includes three conventional attenuation circuits for adjusting the relative amplitudes of the components of the IF signal to properly shape the IF band-pass or frequency response characteristic so that adjacent channel interference is precluded and in order that the particular amplitude ratio, required for intercarrier operation, is established between the picture and sound carriers. Specifically, filter network 14 includes one attenuation trap tuned to 39.75 megahertz to reject the picture carrier of the upper adjacent television channel, and another attenuation trap tuned to 47.25 megahertz to reject the sound carrier of the lower adjacent channel. The closest undesired RF carriers are the picture RF carrier of the channel immediately above the selected channel and the sound RF carrier of the channel immediately below. Traps tuned to 39.75 and 47.25 megahertz will suppress the IF counterparts of the undesired RF carriers.

Network 14 also comprises a trap circuit having a resonant frequency of 41.25 megahertz to introduce a measured amount of attenuation to the sound carrier as a consequence of which the 4.5 megahertz intercarrier signal (namely the beat signal developed between the sound and picture carriers) is appropriately frequency modulated by the sound information in accordance with the intercarrier principle.

The output of the second IF amplifier is coupled to the input of the third IF amplifier 18 which comprises a transistor 21 of the bipolar type and NPN gender. The transistor is coupled in common emitter configuration, its base 22 coupled via a capacitor 23 to the upper output terminal of the second IF amplifier, the lower terminal of which is connected to a plane of reference potential such as ground. Emitter 24 of the transistor is connected to ground through a biasing resistor 25 shunted by an AC bypass capacitor 26. Device 21 has a $\pi$-coupled tuned output circuit tuned to resonate at approximately 44.5 megahertz. More particularly, a capacitor 29 is coupled between collector 31 and ground and the collector is also coupled through an inductance coil 33 and a series-connected biasing resistor 34 to the positive terminal 35 of a source of DC or unidirectional operating potential, the negative terminal of which is grounded. The junction, designated by the reference numeral 36, of coil 33 and resistor 34 is coupled to ground through a capacitor 38 and is also connected by a biasing resistor 39 to base 22, the base being returned to ground via a biasing resistor 41. Resistors 25, 34, 39 and 41 along with potential source 35 establish the elements of transistor 21 at appropriate voltages for conventional Class A operation.

The $\pi$-coupled tuned output circuit comprises primarily capacitors 29 and 38 and coil 33. The output signal of IF amplifier 18 is derived between junction 36 and ground. Capacitor 38 therefore shunts the amplifier's output terminals, with the result that amplifier 18 constitutes a capacitive signal source; namely it has a capacitive internal output impedance. The reasons for having amplifier 18 present an output capacitance to the circuitry coupled thereto will be explained. Preferably, the capacitance of capacitor 38 is made substantially greater than that of capacitor 29 in order that amplifier 18 constitutes not only a capacitive signal source but also a relatively low impedance source for reasons to be explained.

The three-stage IF amplification system is capable of amplifying the IF signal to the extent necessary before detection of the information carried by that signal. However, before the brightness and color information is extracted from the IF signal it is imperative that the sound carrier component be strongly attenuated and rejected to prevent beating or heterodyning of the sound carrier with the color carrier or its modulation sidebands. In the absence of sound carrier suppression prior to luminance and chromadetection those unwanted cross-modulation or beat signals, particularly the 920 kilohertz beat signal between the sound and color carriers, will be detected in the detector and will introduce in the video signals delivered to the color picture tube interfering signal components of an amplitude sufficient to effect noticeable distortion and degradation of the reproduced color image.

Adequate sound carrier rejection is achieved by means of a bridged-T trap 44 which is coupled and interposed between the output of IF amplifier 18 and the input of a luminance and chrominance detector 45 which is of conventional construction. More specifically, trap 44 has an input terminal connected to junction 36, a grounded common terminal, and an output terminal coupled through a capacitor 46 to the upper input terminal of detector 45, the lower input terminal of the detector being grounded. A pair of capacitors 47, 48 are series-connected between the trap's input and output terminals, and the junction of the capacitors is connected through an inductance coil 52 to the grounded common terminal. A bridging resistor 53 is also connected between the input and output terminals of the trap.

Trap 44 constitutes one conventional form of a bridged-T trap circuit and is tuned to resonate at, and hence reject, the sound carrier frequency or 41.25 megahertz as indicated in the drawing. Such a trap is effectively a bridge which is balanced, and effects maximum attenuation, at the rejection frequency. The current flowing to the trap's output terminal through resistor 53 is equal in magnitude but of opposite phase to the current flowing to that terminal through capacitor 48. The two currents cancel or null each other so that there is substantially a zero output at the 41.25 megahertz rejection frequency. The transfer impedance of trap 44, which is the ratio of the output voltage to the input current, is therefore essentially zero at the rejection frequency, and this is true even though coil 52 may have a significant amount of equivalent series resistance. Resistor 53, which constitutes the bridging arm of the trap, effectively compensates or neutralizes the equivalent series resistance of the coil. Neutralization of the coil's series resistance by means of bridging resistors 53 permits the realization of extremely high attenuation of the 41.25 megahertz sound carrier frequency. Maximum rejection or complete nulling is obtained when the bridging resistance is approximately four times the coil resistance.

Preferably, the inductance of coil 52 is made adjustable so that the sound carrier trap may be precisely tuned. Coil 52 may take the form of that described and claimed in U.S. Pat. No. 3,356,969, issued Dec. 5, 1967 to Adam W. Przybyszewski, and assigned to the assignee of the present application. A coil construction is disclosed in that patent which comprises a pair of differently constituted and independently adjustable tuning cores. When one of the cores is adjusted both the inductance and resistance of the coil are varied, with the result that the Q of the coil remains essentially constant. Movement of the other core produces predominantly variations in the equivalent resistance of the coil and thus the Q of the coil. With this construction, one of the cores of coil 52 may be adjusted to tune the trap to 41.25 megahertz, while the position of the other core may be varied to change the equivalent resistance of the coil, and hence the ratio between the bridging and coil resistances, so that maximum attenuation may be obtained. Variations from the optimum four-to-one ratio lowers the amount of attenuation from that otherwise obtainable.

At the rejection frequency of trap 44 neither the impedance of the generator (namely the output impedance of amplifier 18) nor that of the load circuit coupled to the output of the trap can affect the balance conditions. Hence the source impedance, as seen by and presented to the input of the trap, has no influence on the operation of the trap at the sound carrier frequency. At frequencies other than the sound carrier frequency, however, the internal output impedance of IF signal source 18 has a definite bearing on the shape of the frequency response curve of the network which couples the second IF amplifier to detector 45. Of particular interest is the influence of the output capacitance of amplifier stage 18 on the response curve at the intermediate frequencies above the sound carrier frequency. For reasons to be explained, at those frequencies trap 44 is inductive.

The load circuit of trap 44 also includes an inductance coil 59 coupled between the upper input terminal of detector 45 and ground. The coil in combination with capacitors 46 and 38 form a tuned circuit tuned to resonate at approximately 44.5 megahertz, the same frequency as that to which circuit 29, 33, 38 is tuned. Since capacitor 38 is common to both of the tuned circuits, a double-tuned interstage coupling network is provided with capacitor 38 contributing the major coupling between the primary and secondary tuned circuits of the network. Tuning of both the primary and secondary tuned circuits to 44.5 megahertz facilitates the achievement of maximum response with respect to the desired video signal components to be delivered to detector 45.

As mentioned, the internal output impedance of IF signal source 18 not only is capacitive but is relatively low. One advantage of feeding trap 44 from a low impedance source is that the construction of the trap and the physical spacing of its elements as well as its connection to amplifier 18 are considerably less critical than is the case when the signal generator represents a relatively high impedance. With a low impedance signal source the circuit elements are not sensitive to stray capacities and stray pick-ups. Moreover, and of substantial importance, shielding is less critical when operating at a low impedance.

The secondary tuned circuit (38, 46, 59) aids in broadening the IF passband in addition to maximizing the response for the desired components. Furthermore, the secondary tuned circuit serves to impedance match trap 44 to the input of detector 45. The tuned circuit steps-up the impedance so that the detector is supplied from a high impedance source, as is required to optimize the operation of a luminance and chrominance detector of conventional construction.

Detector 45 derives the brightness information from the picture carrier of the IF signal and the color information from the color carrier. One output of detector 45 is coupled through a luminance amplifier 61 to an input of a conventional three-beam tricolor picture tube 62 to supply an amplified brightness signal to the cathode of each of the tube's three electron guns. The color information, derived at another output of detector 45, is represented by a phase and amplitude modulated 3.58 megahertz subcarrier. That output is coupled to a chromaamplifier which in turn is coupled to a color demodulator, the amplifier and demodulator being shown by the single block 65. In well known fashion the color demodulator detects the color information carried by the modulated subcarrier and develops three color difference signals respectively corresponding to the chrominance information associated with the three primary colors red, green and blue. Each of these three signals is applied to the control grid of a respective one of the three electron guns of picture tube 62. In customary manner each of the three electron beams is simultaneously intensity modulated by the luminance signal and an assigned color difference signal.

Since trap 44 removes the sound carrier component from the IF signal applied to detector 45, detection of the sound information for application to the audio section of the receiver must be made from the IF signal taken from a point in the IF amplifying channel prior to trap 44. Accordingly, collector 31 is coupled through a capacitor 67 to one input terminal of a detector 68, its other input terminal being grounded. Detector 68 extracts the audio information from the sound modulated 4.5 megahertz intercarrier component. In addition, the detector derives the vertical and horizontal synchronizing components from the IF signal. The detected sound and sync pulses are applied to an amplifier, one output of which is coupled to a synchronizing signal separator which separates the vertical and horizontal sync pulses from each other and from the remainder of the output signal of detector 68. The sound and sync amplifier and sync separator are illustrated by a single block 71. Another output of the amplifier is coupled to an audio system 72 which contains appropriate audio amplification circuitry and a speaker. The separated sync pulses are applied to suitable sweep systems which in turn effect two-dimensional scanning of the three beams of picture tube 62 to reproduce a color image upon the tube's screen in a manner well known in the art. A conventional sweep and convergence system is employed to develop appropriate dynamic scanning signals for picture tube 62. For convenience, the sweep and convergence systems have been schematically illustrated by a single block 75.

Figure 2:
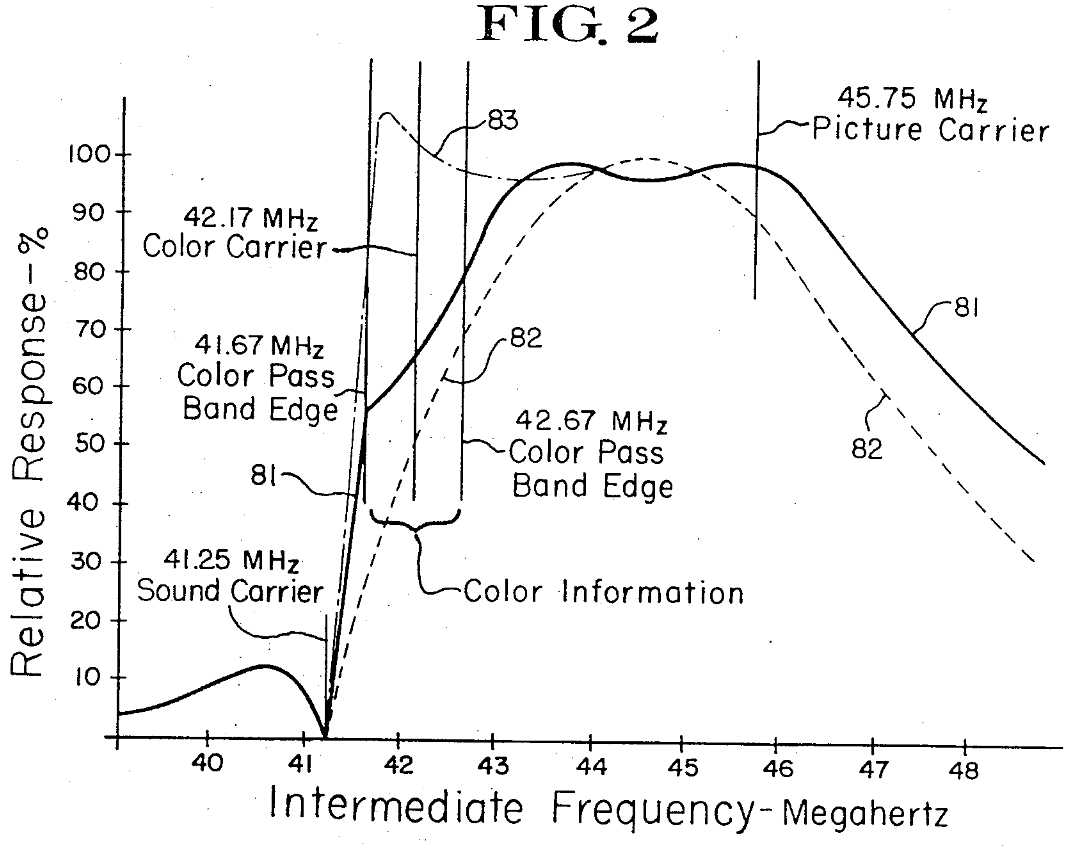
FIG. 2 depicts different frequency response characteristics helpful in explaining the operation of the network of FIG. 1.

Aside from the construction of the IF coupling network between the third IF amplifier and detector 45, the described arrangement is a color television receiver of conventional design and construction the operation of which is well understood in the art and need not be further explained. Accordingly, attention will now be directed to the operation of the invention as embodied in that coupling network. The explanation will be aided by the frequency response curves of FIG. 2, each of which plots the relative amplitude response or gain of the coupling network as a function of frequency. The response curve obtainable with the invention is adjustable and may be shaped within wide limits to effect a desired response relative to the color information signal components. Curve 81, shown in full line construction, may be achieved with the FIG. 1 embodiment and, for reasons to be explained, is preferred.

As depicted by curve 81, bridged-T trap 44 establishes a sharp notch in the band-pass characteristic at the sound carrier frequency 41.25 megahertz and this will adequately suppress the sound carrier to the extent necessary to virtually eliminate it from the input signal delivered to detector 45, thereby avoiding undesired intermodulation interference in the reproduced image. An inspection of response characteristic 81 reveals that the 45.75 megahertz picture carrier and its modulation components as well as the color carrier (42.17 megahertz) and its modulation components (extending in the frequency range or passband from 41.67 to 42.67 megahertz) are all translated with sufficient amplitude to the input of the brightness-chrominance detector. The double humping of curve 81 with a dip or depression at 44.5 megahertz is obtained by overcoupling primary tuned circuit 29, 33, 38 and secondary tuned circuit 38, 46, 59.

The response characteristic undergoes a sharp upwards transition from the 41.25 megahertz sound carrier frequency to the 41.67 megahertz frequency which represents the lowermost boundary or the low-frequency edge of the color passband. In the absence of the invention, a rejection trap of appropriate construction could be interposed between the third IF stage and detector 45 and it would adequately suppress the sound carrier. In so doing, however, the modulation sidebands of the color carrier would be substantially attenuated with the result that the color content of the reproduced image would suffer significantly. Curve 82 shown in dashed construction illustrates the response curve that would be obtained with such a prior arrangement. Besides attenuating the color information, curve 82 shows that the bandwidth of the IF signal is substantially reduced as a consequence of which the modulation components of the 45.75 megahertz picture carrier are significantly attenuated. By comparing curves 81 and 82 it will be observed that the present invention achieves over prior circuits a 10 percent increase in amplitude response at the picture carrier and a 15 percent increase at the color carrier.

The boost effectively obtained in the response curve for the color information is achieved by the conjoint operation of trap 44 and the internal output impedance of IF signal source 18. As mentioned, the output impedance of that signal source is capacitive and, with respect to frequencies above the sound carrier, frequency trap 44 is inductive, effectively placing an inductive reactance across the line and in shunt with the source capacitance. The electrical sizes of the various circuit elements may be selected and adjusted so that the combination of the output capacitance of source 18 and the inductance of the trap 44 will effectively form a parallel resonant circuit tuned to a frequency (41.67 megahertz in the described embodiment) around the low-frequency end of the frequency range (41.67 to 42.67 megahertz) covered by the modulation sidebands of the color carrier. Such parallel resonant tuning of the output capacitance of amplifier stage 18 and the inductance of trap 44 causes the amplitude response to increase sharply in the narrow band between 41.25 and 41.67 megahertz, with the result that a desired response is achieved for the color information. By an appropriate selection of the Q of the parallel resonant circuit if is found that substantially the entire passband of the IF signal is boosted. This boost augments the wide bandwidth response effected by the employment of the double-tuned interstage coupling, as a consequence of which the in-band insertion loss introduced by the rejection circuitry is very low and considerably smaller than that caused by the prior circuits. In this connection it should be mentioned that many of the prior sound rejection circuits employ tuned circuits that must be tuned to a frequency outside of the IF passband in order to correct or counter deleterious effects of trapping out the sound carrier. This manifests in a high insertion loss with respect to the desired components to be supplied to the luminance and chromadetector.

While response curve 81 is preferred, it is to be understood that by practicing the invention a substantially greater response than that indicated by the curve may be obtained for the color information. Actually, a response as high as that illustrated by the dash-dot construction line 83 may be realized. The particular shape of the response curve for the color passband is determined by the ratio between the output capacitance of IF signal source 18 and the input capacitance of bridged-T trap 44. By decreasing the ratio the amplitude response for the color information signals increases. Wide latitude is thus available in adjusting the response curve. If desired, the curve may be made substantially flat from 41.67 to 42.67 megahertz. Curve 81 is sloped in that frequency range since it is customary for the response curve of the color processing circuitry following the IF amplifying system, particularly the chromaamplifier and demodulator, to exhibit a complementary or opposite slope. In this way, all of the color signal components supplied to the picture tube will have been subjected to the same amount of overall amplification.

In the embodiment of FIG. 1 the load circuit coupled to the output of trap 44 includes capacitor 46 and coil 59 which, in addition to providing output tuning, step the impedance up as required to optimize the coupling between amplifier stage 18 and detector 45. In a different environment of the invention impedance transformation or matching is not needed. This is the case in the embodiment of FIG. 3 where trap 44 is interposed between the second and third IF amplifiers. The second IF amplifier may take the same construction as amplifier 18 in FIG. 1 and the input of trap 44 may be coupled to the second IF stage in the same manner as shown in FIG. 1. Since the third IF amplifier is transistorized, it requires a low impedance signal source. Thus, the output of trap 44 may be directly coupled to the third IF stage in FIG. 3. A low impedance source delivers the IF signal to trap 44 and this signal is translated through the trap to the input of the third IF amplifier at substantially the same low impedance level. Hence, in FIG. 3 there will be no need for counterparts of capacitor 46 and coil 59.

Figure 3:
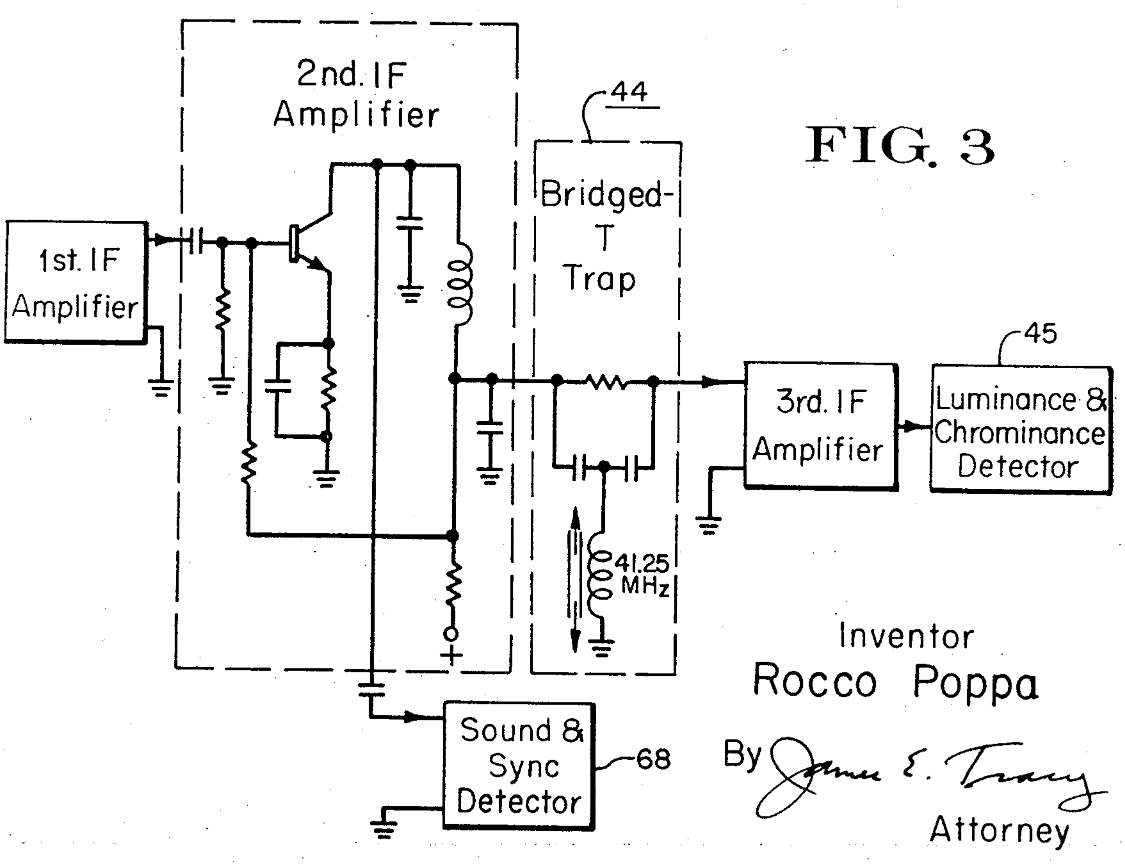
FIG. 3 illustrates a portion of the receiver of FIG. 1 modified in accordance with another embodiment of the invention.

Of course, since sound carrier rejection occurs in FIG. 3 before the IF signal is applied to the third IF stage, the sound and sync detector 68 must receive its input signal from the output of the second IF amplifier. It has been found that two stages of IF amplification are adequate to amplify the sound and synchronizing components to the extent necessary for proper operation of the receiver.

While a $\pi$-coupled tuned output circuit is employed for the third IF amplifier in FIG. 1 and for the second IF amplifier in FIG. 3, those tuned circuits may take a variety of different forms. For example, they may be series resonant or capacitive tapped.

The invention provides, therefore, a novel and inexpensive filter network for processing the IF signal of a color television receiver before the color and brightness information is extracted from that signal. The filter accepts from the IF signal, without introducing attenuation, the picture and color carriers and their respective modulation components, while at the same time rejecting the sound carrier which is essentially adjacent to the low-frequency end of the range of intermediate frequencies covered by the modulation components of the color carrier.

While particular embodiments of the invention have been shown and described, modifications may be made, and it is intended in the appended claims to cover all such modifications as may fall within the true spirit and scope of the invention.

I claim:

1. An intermediate frequency coupling network for use in a color television receiver, comprising:

a signal source presenting a substantially low level, capacitive output impedance and providing an intermediate frequency signal which includes a modulated picture carrier, a modulated color carrier having a frequency lower than that of said picture carrier, and a modulated sound carrier whose frequency is lower than and adjacent to the low-frequency end of the range of frequencies covered by the modulation sidebands of the color carrier;

a bridged-T coupling and trap network having an input terminal coupled to said signal source, an output terminal for coupling to a load circuit, and a common terminal returned to a plane of reference potential, said bridged-T network having circuit means tuned to effect maximum attenuation between said input and output terminals for signals at said sound carrier frequency and to present an essentially inductive impedance for signals above said sound carrier frequency; and said inductive impedance of said bridged-T network and said capacitive output impedance of said signal source forming a parallel-tuned circuit at frequencies above said sound carrier and within the range of frequencies covered by the modulation sidebands of said color carrier so as to effectively boost the color information conveyed thereby to a predetermined, selectable level.

2. An intermediate frequency coupling network according to claim 1 in which said circuit means includes a resistive element coupled between said input and output terminals of said bridged-T network, forming a first signal path therebetween, and a pair of serially connected capacitive elements in parallel with said resistive element, forming a second signal path, and an inductive element connected between the junction of said capacitors and said plane of reference potential.

3. An intermediate frequency coupling network according to claim 2 in which said maximum attenuation is provided by said capacitive and inductive elements forming a series resonant circuit so as to present a low impedance path to said plane of reference potential for signals at said sound carrier frequency, and by said resistive element having a selected value whereby signals at said sound carrier coupled to said output terminal through said respective signal paths are of substantially equal magnitude but of opposite phase.

4. An intermediate frequency coupling network according to claim 4 in which resistance of said inductance connected between the junction of said capacitors and said plane of reference potential is approximately one-fourth the value of said resistance bridging said input and output terminals of said bridged-T network.

5. An intermediate frequency coupling network according to claim 1 in which the picture carrier is approximately 45.75 Mhz, the color carrier is approximately 42.17 Mhz, the sound carrier is approximately 41.25 Mhz, and said inductive impedance of said bridged-T network and said capacitive output impedance of said signal source forms said parallel-tuned circuit having a resonance at approximately 41.67 Mhz.

6. An intermediate frequency coupling network according to claim 1 in which said signal source includes a tuned circuit in its output comprising an inductance connected between the output of said signal source and the input of said bridged-T network, a first capacitance connected in shunt with said output of said signal source, and a second capacitance having a value substantially greater than that of said first capacitance and connected in shunt with the input of said bridged-T network.

7. An intermediate frequency coupling network according to claim 7 in which the level of boost effected for said color information conveyed by the sidebands of said color carrier is essentially determined by the ratio between said capacitance in shunt with the output of said signal source and said capacitance connected in shunt with the input of said bridged-T network.

8. An intermediate frequency coupling network according to claim 7 in which said tuned circuit in the output of said signal source is resonant at a frequency between said color and picture carriers.

9. An intermediate frequency coupling network according to claim 1 and which constitutes a double-tuned interstage coupling network, said signal source including a primary tuned circuit and said load circuit essentially including a secondary tuned circuit, with a portion of the primary tuned circuit being common to and included in the secondary tuned circuit.

10. An intermediate frequency coupling network according to claim 1 in which said load circuit includes the input of an intermediate frequency amplifier stage.